US007551808B2

United States Patent
Tanaka

(10) Patent No.: US 7,551,808 B2
(45) Date of Patent: Jun. 23, 2009

(54) OPTICAL SIGNAL NOISE SUPPRESSOR AND OPTICAL SIGNAL NOISE SUPPRESSING METHOD

(75) Inventor: Masato Tanaka, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 11/987,755

(22) Filed: Dec. 4, 2007

(65) Prior Publication Data

US 2008/0144987 A1   Jun. 19, 2008

(30) Foreign Application Priority Data

Dec. 5, 2006   (JP) ............................ P2006-328444

(51) Int. Cl.
G02F 1/01   (2006.01)
G02B 6/00   (2006.01)

(52) U.S. Cl. ............................. 385/1; 385/122; 359/238

(58) Field of Classification Search ........................ None
See application file for complete search history.

(56) References Cited

U.S. PATENT DOCUMENTS

2002/0048061 A1 * 4/2002 Glingener et al. ........... 359/110

FOREIGN PATENT DOCUMENTS

JP   08-054653   2/1996

OTHER PUBLICATIONS

"Nonlinear Fiber Optics", G.P. Agrawal, Academic Press, p. 263-273, 1989.
"Noise characteristics of fiber-based optical phase conjugators", P.O. Hedekvist et al., Journal of Lightwave Technology, vol. 17, No. 1, Jan. 1999, p. 74-79.

* cited by examiner

*Primary Examiner*—Omar Rojas
(74) *Attorney, Agent, or Firm*—Venable LLP; Michael A. Sartori; Justine A. Gozzi

(57) ABSTRACT

The present invention provides an optical signal noise suppressor and an optical signal noise suppressing method that can decrease noise components to be superimposed on signal light. The optical signal noise suppressor is a device for suppressing noise caused by SBS which is generated when a signal light propagates from a first end side to a second end side of an optical fiber, and comprises a light source section, an optical attenuator, an optical circulator and an optical isolator. A counter light, outputted from the light source section and passing through the optical attenuator, is guided into the optical fiber via the optical circulator. The counter light guided into the optical fiber is interrupted by the optical isolator, and does not reach the signal light source section. The counter light has the same optical frequency components as the SBS light generated by the propagation of the signal light, and propagates in the optical fiber in an opposite direction of the propagation direction of the signal light.

7 Claims, 6 Drawing Sheets

OPTICAL SIGNAL NOISE SUPPRESSOR AND OPTICAL SIGNAL NOISE SUPPRESSING METHOD

BACKGROUND OF THE INVENTION

1. Field of the Invention

The present invention relates to a device and method for suppressing noise caused by stimulated Brillouin scattering (SBS) which is generated when signal light propagates through an optical fiber.

2. Related Background Art

A technology for processing wavelength conversion and waveform shaping of high-speed signal light using a nonlinear optical effect, which is generated when a high power light propagates through an optical fiber, has been proposed. Such a technology is described in, for example, Japanese Patent Application Laid-Open No. 8-54653, G. P. Agrawal, "Nonlinear Fiber Optics", Academic Press, and P. O. Hedekvist et al., "Noise characteristics of fiber-based optical phase conjugators", Journal of lightwave technology, vol. 17, No. 1, January, 1999. However, in the case that this technology is used, SBS is generated when the intensity of the signal light is too high. SBS is a phenomena whereby propagation light receives a backward scattering effect by the propagation light itself, when the propagation light induces acoustic vibrations at coupling in the optical fiber. The scattering light also becomes a seed and prompts the next scattering. So, when the intensity of the propagation light exceeds a certain threshold, the scattering lights increase exponentially.

SUMMARY OF THE INVENTION

The inventors have studied prior arts in detail, and as a result, have found problems as follows. That is, the initial seed of stimulated Brillouin scattering (SBS) is caused by thermal noise, so the scattering light itself contains many noise components, and the noise components are also superimposed onto lights transmitted through optical fiber without being scattered. This means that the quality of signal light decreases due to SBS.

In order to overcome the above-mentioned problems, it is an object of the present invention to provide an optical signal noise suppressor and optical signal noise suppressing method which can decrease the noise components to be superimposed onto signal light.

An optical signal noise suppressor according to the present invention is a device for suppressing noise caused by SBS generated when signal light propagates, and comprises an optical fiber having a first end where a signal light enters and a second end opposing the first end, a pumping light source section, a first coupler arranged at the second end side of the optical fiber, and an interruption section arranged so as to sandwich the optical fiber together with the first coupler. The pumping light source section outputs a counter light with the same optical frequency components as the SBS light generated in the optical fiber by propagation of the signal light. The first coupler guides the counter light outputted from the pumping light source section into the optical fiber such that the counter light propagates in the optical fiber from the second end to the first end, whereby the counter light guided into the optical fiber propagates in an opposite direction of the signal light. The interruption section selectively interrupts the counter light which is guided into the optical fiber via the first coupler and which is emitted from the first end of the optical fiber.

In accordance with the present invention, the counter light, which is output from the pumping light source section, has the same optical frequency components as the SBS light generated by the propagation of signal light through optical fiber, and is guided into the optical fiber by the first coupler, and propagates in the optical fiber from the second end side to the first end side. By this, SBS is forcibly generated, and noise superimposed onto the signal light caused by SBS can be suppressed.

In the optical signal noise suppressor according to the present invention, it is preferable that the pumping light source section is a broadband light source which outputs broadband light. In this case, even signal light has a plurality of high power frequency components or the frequency thereof is variable, the noise component which is superimposed on the signal light can be decreased. This broadband light source is a light source which has a range more than the band of the SBS light with respect to the signal light, and it is preferable to output a broadband light which includes the C band, for example, and it is also preferable to output a broadband light of which band width is 100 GHz or more.

In the optical signal noise suppressor according to the present invention, it is preferable that the overall length of the optical fiber is 1 km or less, and that the nonlinearity coefficient of the optical fiber is $10\ W^{-1}\cdot km^{-1}$ (1/W/km) or more.

It is preferable that the optical signal noise suppressor according to the present invention further comprises an optical filter which is disposed on a propagation path of the signal light in a subsequent stage of the first coupler. The optical filter interrupts the SBS light which is generated in the optical fiber by the propagation of the counter light. In this case, the SBS light, generated by the propagation of the counter light in the optical fiber, is interrupted by the optical filter, so the superimposing of noise due to SBS on the signal light is suppressed.

It is preferable that the optical signal noise suppressor according to the present invention further comprises an optical attenuator which is disposed on an optical path between the pumping light source section and the first coupler. In this case, the counter light outputted from the pumping light source section is power-adjusted by the optical attenuator, and is then guided into the optical fiber by the first coupler.

It is preferable that the optical signal noise suppressor according to the present invention further comprises a second coupler extracting counter light, which is amplified by SBS, from the signal light in the optical fiber, and a light receiver which receives the counter light extracted by the second coupler and detects the power of the counter light. Here, it is preferable that the pumping light source section adjusts the intensity or wavelength of the counter light which is output, based on the power detected by the light receiver. In this case, the counter light amplified by SBS from the signal light in the optical fiber is extracted by the second coupler, and is received by the light receiver, and the power thereof is detected. Then, in the pumping light source section, the intensity or wavelength of the counter light to be outputted is controlled based on the power detected by the light receiver.

An optical signal noise suppressing method according to the present invention is a method for suppressing, in an optical fiber having a first end where signal light enters and a second end opposing the first end, noise caused by SBS generated when the signal light propagates from the first end to the second end, comprising a counter light generating step and a guiding step. In the counter light generating step, the counter light generated has the same optical frequency components as the SBS light generated in the optical fiber by propagation of the signal light. In the guiding step, the generated counter light is guided such that the counter light propagates in the optical fiber from the second end to the first end, whereby the noise caused by SBS, which is superimposed on the signal light, is suppressed.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will be apparent to those skilled in the art from this detailed description.

DETAILED DESCRIPTION OF THE PREFERRED EMBODIMENTS

In the following, embodiments of an optical signal noise suppressor and an optical signal noise suppressing method according to the present invention will be explained in detail with reference to FIGS. 1 to 6. In the explanation of the drawings, constituents identical to each other will be referred to with numerals identical to each other without repeating their overlapping descriptions.

First Embodiment

Figure 1:
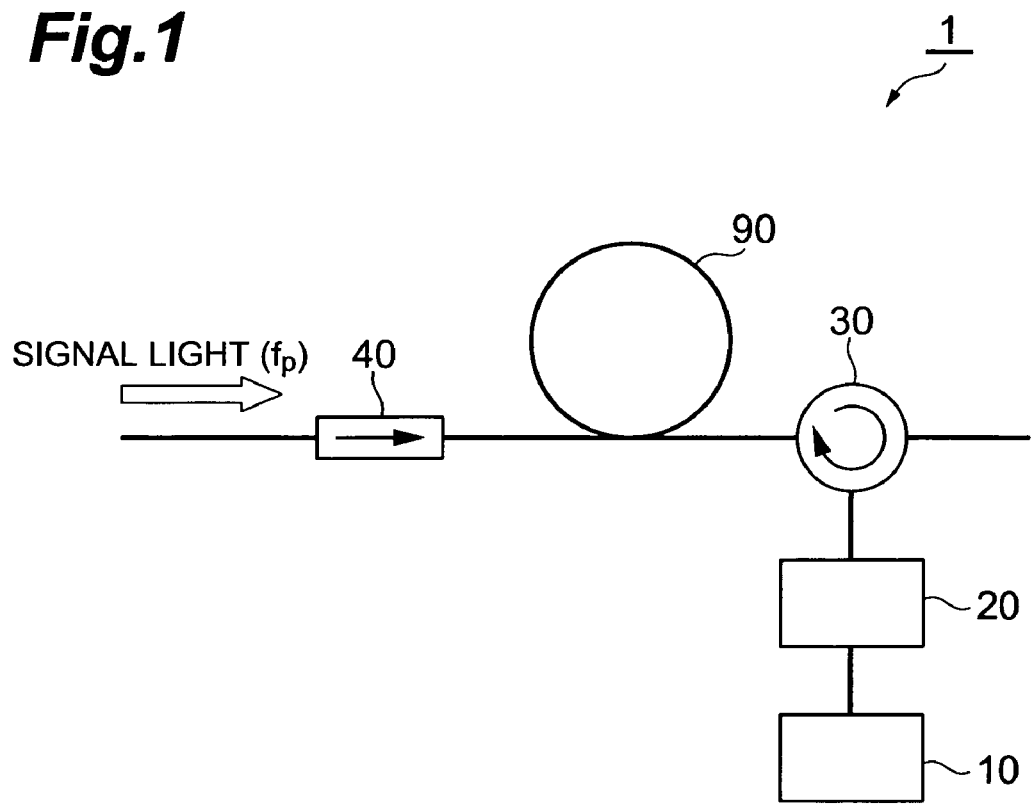
FIG. 1 is a view showing a configuration of a first embodiment of an optical signal noise suppressor according to the present invention.

A first embodiment of the optical signal noise suppressor and the optical signal noise suppressing method is described first. FIG. 1 is a view showing a configuration of a first embodiment of an optical signal noise suppressor according to the present invention. The optical signal noise suppressor 1 according to the first embodiment, shown in FIG. 1, is a device for suppressing noise caused by stimulated Brillouin scattering (SBS), which is generated when a signal light propagates in an optical fiber 90 from a first end side to a second end side, and comprises a light source section 10, optical attenuator 20, optical circulator (first coupler) 30 and an optical isolator (interruption section) 40.

In an optical fiber 90, the signal light propagates from the optical isolator 40 to the optical circulator 30. A single optical frequency or a plurality of optical frequencies may be used for the signal light. A single optical frequency is for the case of performing signal processing using self phase modulation, and a plurality of optical frequency is for a case of performing signal processing using cross phase modulation (XPM) based on four light waves mixing. It is preferable that the overall length of the optical fiber 90 is 1 km or less, and the nonlinear constant thereof is 10 $W^{-1} \cdot km^{-1}$ or more.

The pumping light source section 10 outputs a counter light having the same optical frequency components as the SBS light, which is generated by the propagation of the signal light in the optical fiber 90. When the optical frequency of the signal light is fp and the Brillouin frequency shift in SBS is $\Delta vB$, then the pumping light source section 10 outputs the counter light of which optical frequency is (fp–$\Delta vB$). When the signal light has a plurality of optical frequencies, the optical frequency of the signal light, of which light intensity is the highest, should be fp.

The optical attenuator 20 inputs the counter light which is outputted from the pumping light source section 10, attenuates the counter light to be a desired power by causing a predetermined loss, and outputs this counter light to the optical circulator 30. The optical circulator 30 guides the counter light, which is outputted from the pumping light source section 10 and passes through the optical attenuator 20, into the optical fiber 90, and propagates the counter light in the optical fiber 90 from the second end side to the first end side. The optical isolator 40 interrupts the counter light, which is guided into the optical fiber 90 by the optical circulator 30, and is emitted from the first end of the optical fiber 90.

Now the operation of the optical signal noise suppressor 1 of the first embodiment is described, and also the optical signal noise suppressing method of the first embodiment is described. The counter light, which is outputted from the pumping light source section 10 and passes through the optical attenuator 20, is guided into the optical fiber 90 via the optical circulator 30. The counter light guided into the optical fiber 90 is interrupted by the optical isolator 40, and does not reach the signal light source section. The counter light has the same optical frequency components as the SBS light generated by the propagation of the signal light, and propagates through the optical fiber 90 in an opposite direction of the propagation direction of the signal light.

By this, SBS is forcibly generated in the optical fiber 90. If SBS is forcibly generated, the intensity of scattering light to be seeds is constant, so SBS is stable. As a result, although loss due to scattering increases, the noise components in the signal light, due to the instability of SBS, are minimized. Hence noise caused by SBS, superimposed on the signal light, can be suppressed.

Figure 2:
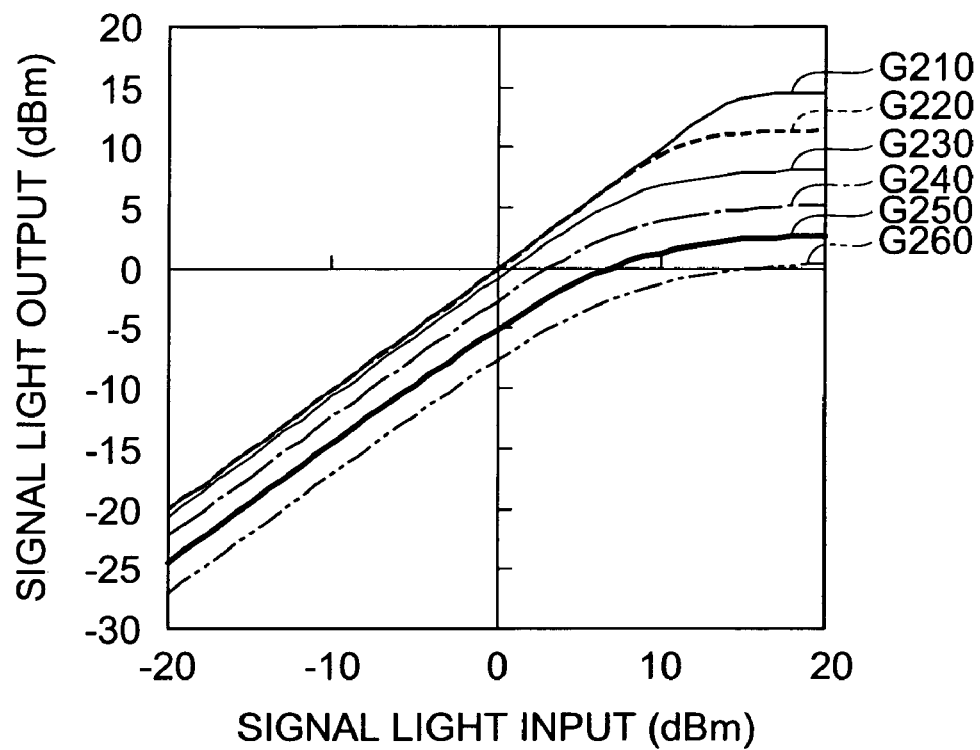
FIG. 2 is a graph showing the relationship between the signal light input power and the signal light output power when SBS is forcibly generated.

FIG. 2 is a graph showing the relationship between the signal light input power and the signal light output power when SBS is forcibly generated. FIG. 2 shows the calculation result of the relationship between the signal light input power and the signal light output power when the intensity of the counter light varies. The optical fiber 90 that was assumed here has high nonlinearity, and has an effective area of 10 $\mu m^2$, a fiber attenuation of 0.9 dB/km, a Brillouin gain coefficient of $5 \times 10^{-11}$ m/W, and a fiber length of 0.1 km. The calculation is based on one written in G. P. Agrawal, "Nonlinear Fiber Optics", and SBS of the counter light itself is ignored. In FIG. 2, the graph G210 indicates the relationship between the signal light input power and the signal light output power when the counter light intensity is –50 dBm, the graph G220 indicates the relationship between the signal light input power and the signal light output power when the counter light intensity is –20 dBm, the graph G230 indicates the relationship between the signal light input power and the signal light output power when the counter light intensity is −6 dBm, the graph G240 indicates the relationship between the signal light input power and the signal light output power when the counter light intensity is 0 dBm, the graph G250 indicates the relationship between the signal light input power and the signal light output power when the counter light intensity is 3 dBm, and the graph G260 indicates the relationship between the signal light input power and the signal light output power when the counter light intensity is 5 dBm. As can be seen from FIG. 2, the output light intensity saturates as the input light intensity increases. The level at which the output light intensity saturates depends on the intensity of the counter light.

Since the output light intensity is determined depending on the input light intensity, on a one-to-one basis, noise is not generated in the signal light by the process of SBS. The counter light propagates in an opposite direction of the signal light, so the nonlinear optical effect, other than SBS, generated between the signal light and the counter light, is either small or constant, which does not cause unnecessary modulation on the signal light.

As can be seen from this characteristic, when the signal to be inputted to the optical fiber 90 originally has many noise components, the noise components are suppressed at high power level by allowing the counter light to enter, so an effect as 2R effect (noise removal at 1/0 level of the signal) can be expected. Since the saturation level of 2R effect depends on the intensity of the counter light, 2R effect of various signal formats can be supported by adjusting the intensity of the counter light using the optical attenuator 20.

Also, as can be seen from this characteristic, the optical signal noise suppressor 1 can be used as an optical limiter to suppress the excessive input of optical power, for an optical device on the signal light propagation path in a subsequent stage of the optical circulator 30. SBS itself is a very high-speed phenomena in a normal optical fiber, but an excessive intensity change, due to the transfer of power between the signal light and the counter light, reaches several to 10 times the propagation time in optical fiber. Therefore, when the optical signal noise suppressor 1 is used as an optical limiter, it is preferable that the fiber length of the optical fiber 90 is short (100 m corresponds to several µs of response time). Also, in order to enhance the limiter function, it is preferable that the effective area of the optical fiber 90 is small.

In this way, in accordance with the present embodiment, signal light intensity is adjusted according to the level of intensity of the counter light, without creating a feedback circuit, so high-speed operation is possible. Since SBS is used, the saturation characteristic is powerful, and unnecessary lights can be condensed into one backscattering light which can guarantee safety.

Second Embodiment

Figure 3:
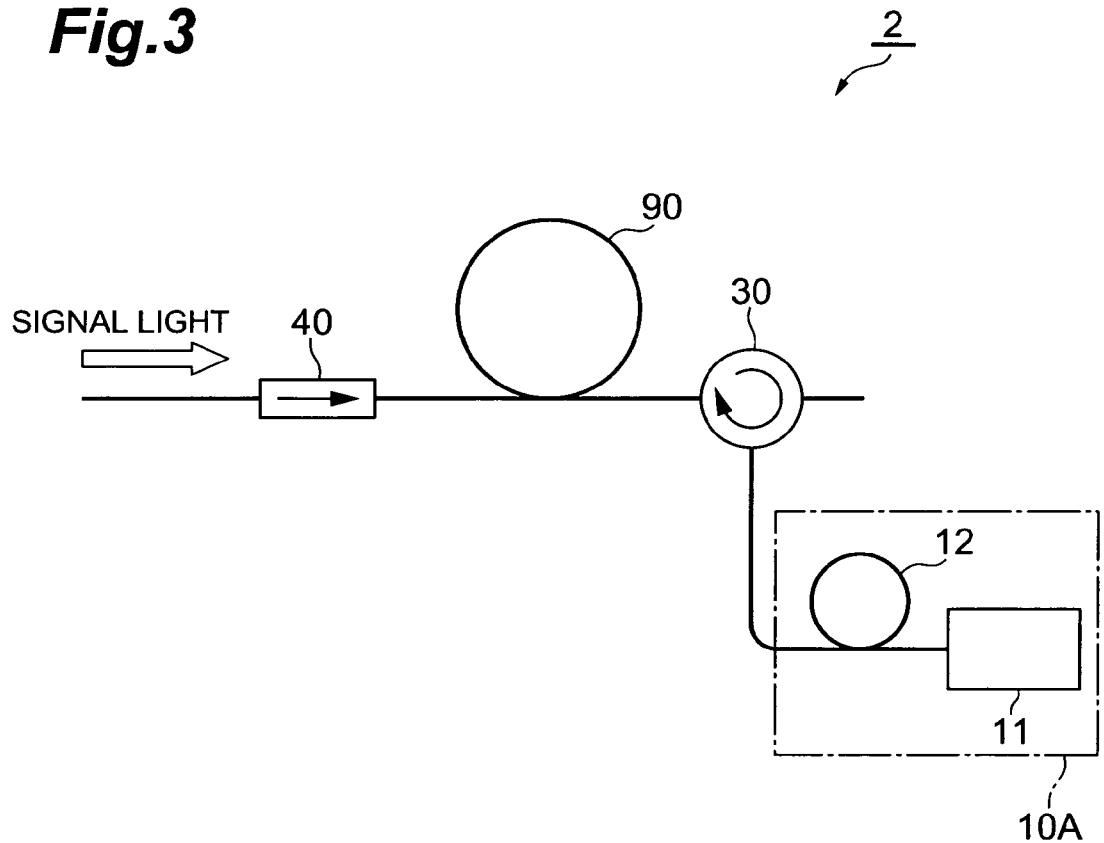
FIG. 3 is a view showing a configuration of a second embodiment of an optical signal noise suppressor according to the present invention.

Next, a second embodiment of the optical signal noise suppressor and the optical signal noise suppressing method according to the present invention will be explained. FIG. 3 is a view showing a configuration of a second embodiment of an optical signal noise suppressor according to the present invention. The difference here from the configuration of the first embodiment shown in FIG. 1 is that the optical signal noise suppressor 2 of the second embodiment in FIG. 3 has a pumping light source section 10A, instead of the pumping light source section 10. In the second embodiment as well, an optical attenuator 20 may be provided between the pumping light source section 10A and an optical circulator 30.

The pumping light source section 10A includes a pumping light source 11 and a highly nonlinear optical fiber 12. In the pumping light source section 10A, the light which was outputted from the pumping light source 11 is inputted to the highly nonlinear optical fiber 12, and bands of this light are broadened by a nonlinear optical phenomena, which is generated while the light is propagating in the high nonlinear optical fiber 12, and this broadband light (super continuum light) is outputted to the optical circulator 30 as a counter light. The broadband light generated in this way has low noise components.

In the second embodiment, the broadband counter light is propagated in the optical fiber 90 in an opposite direction of the signal light propagation direction, so the noise components superimposed on the signal light can be decreased even when a plurality of high power frequency components exist in the signal light, or when the frequency thereof is variable.

Third Embodiment

Figure 4:
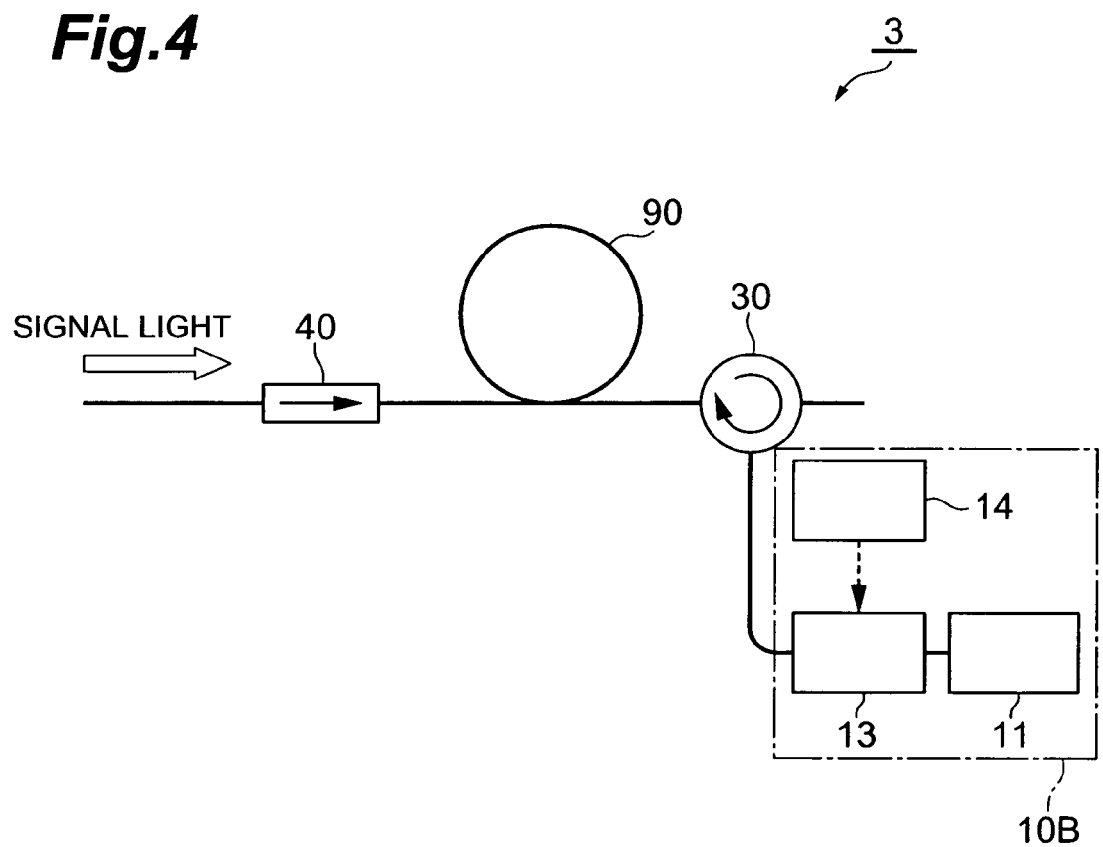
FIG. 4 is a view showing a configuration of a third embodiment of an optical signal noise suppressor according to the present invention.

Next, a third embodiment of the optical signal noise suppressor and the optical signal noise suppressing method according to the present invention will be explained. FIG. 4 is a view showing a configuration of a third embodiment of an optical signal noise suppressor according to the present invention. The difference here from the configuration of the first embodiment in FIG. 1 is that the optical signal noise suppressor 3 of the third embodiment in FIG. 4 has a pumping light source section 10B, instead of the pumping light source section 10. In the third embodiment as well, an optical attenuator 20 may be provided between the pumping light source section 10B and an optical circulator 30.

The pumping light source section 10B includes a pumping light source 11, a phase modulator 13 and a tone signal generator 14. In the pumping light source section 10B, a tone signal, which is outputted from the tone signal generator 14, is inputted to the phase modulator 13, and light, which is outputted from the pumping light source 11, is inputted to the phase modulator 13. The light which is inputted to the phase modulator 13 is phase-modulated and becomes a broadband light including a sub-carrier, and this broadband light is outputted to the optical circulator 30 as a counter light. The broadband light generated in this way has low noise components.

In the third embodiment as well, the broadband counter light is propagated in the optical fiber 90 in an opposite direction of the signal light propagation direction, so noise components superimposed on the signal light can be decreased even when a plurality of high power frequency components exists in signal light, or when the frequency thereof is variable.

Fourth Embodiment

Figure 5:
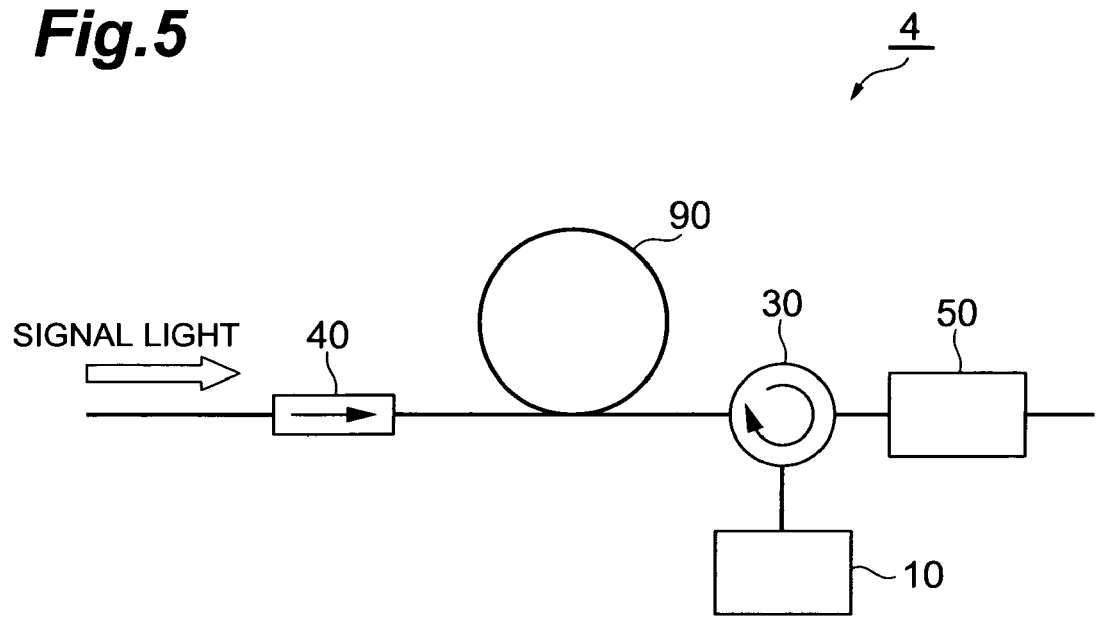
FIG. 5 is a view showing a configuration of a fourth embodiment of an optical signal noise suppressor according to the present invention.

Next, a fourth embodiment of the optical signal noise suppressor and the optical signal noise suppressing method according to the present invention will be explained. FIG. 5 is a view showing a configuration of a fourth embodiment of an optical signal noise suppressor according to the present invention. The difference here from the configuration of the first embodiment shown in FIG. 1 is that the optical signal noise suppressor 4 of the fourth embodiment in FIG. 5 has an optical filter 50. In the fourth embodiment as well, an optical attenuator 20 may be provided between a pumping light source section 10 and an optical circulator 30.

The optical filter 50 is disposed in the subsequent stages of the optical circulator 30, on a propagation path of the signal light, and interrupts the SBS light, which is generated by the propagation of the counter light in the optical fiber 90.

If the power of the counter light, which is outputted from the pumping light source section 10 and is guided into the optical fiber 90, is high, SBS may be generated in the optical fiber 90 by the counter light, and the scattering light thereof may be mixed into the signal light. Therefore it is preferable to interrupt SBS due to counter light, using the optical filter 90.

Fifth Embodiment

Figure 6:
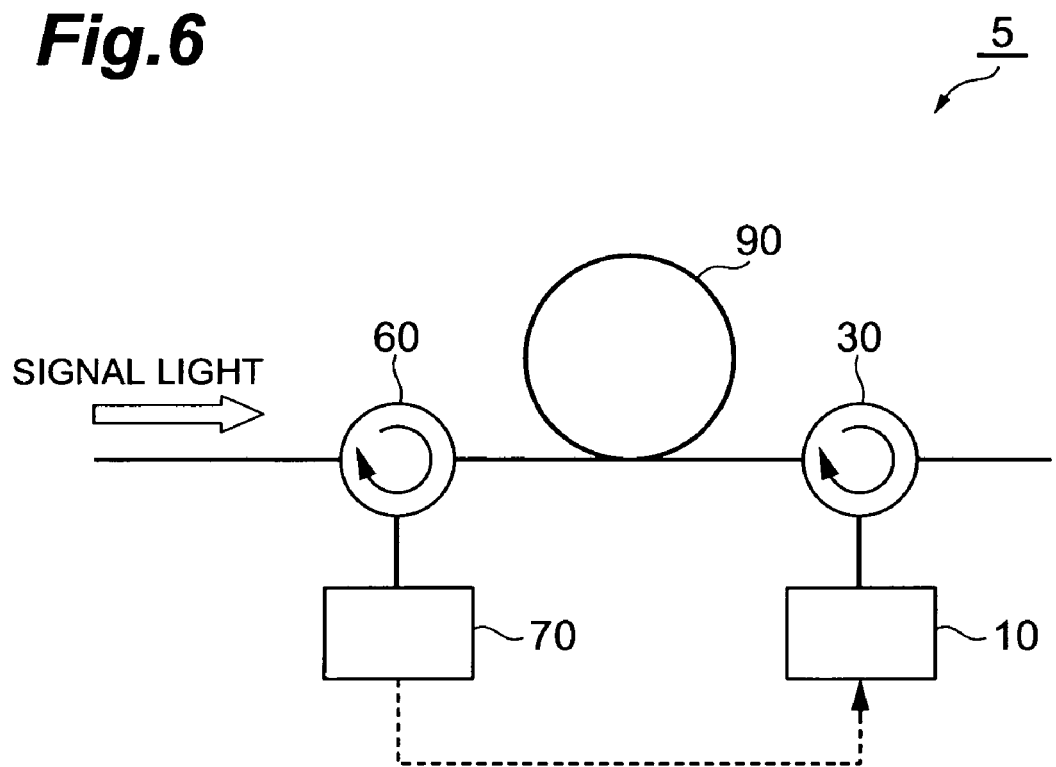
FIG. 6 is a view showing a configuration of a fifth embodiment of an optical signal noise suppressor according to the present invention.

Next, a fifth embodiment of the optical signal noise suppressor and the optical signal noise suppressing method according to the present invention will be explained. FIG. 6 is a view showing a configuration of a fifth embodiment of an optical signal noise suppressor according to the present invention. The difference here from the configuration of the first embodiment shown in FIG. 1 is that the optical signal noise suppressor 5 of the fifth embodiment in FIG. 6 has an optical circulator (second coupler) 60 and a light receiver 70, and that a pumping light source section 10 controls the intensity or the wavelength of the output light based on the power detected by the light receiver 70. In the fifth embodiment as well, an optical attenuator 20 may be provided between a pumping light source section 10 and an optical circulator 30.

The optical circulator 60 extracts a counter light, which is amplified by SBS from the signal light in the optical fiber 90. The light receiver 70 receives the counter light extracted by the optical circulator 60, and detects the power of the counter light. Based on the power detected by the light receiver 70, the pumping light source section 10 controls the intensity or the wavelength of the counter light to be outputted.

In the fifth embodiment, the scattering light is extracted and monitored, so when the optical signal noise suppressor is used as a limiter or 2R effect, the intensity or the wavelength of the light source section 10 can be adjusted to the optimum, while checking the status.

In accordance with the optical signal noise suppressor and the optical signal noise suppressing method of the present invention, the noise components which are superimposed on the signal light can be decreased.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical signal noise suppressing method for suppressing, in an optical fiber having a first end where signal light enters and a second end opposing the first end, noise caused by stimulated Brillouin scattering generated when the signal light propagates from the first end to the second end, comprising the steps of:

generating a broadband light, as a counter light which includes the same optical frequency components as the stimulated Brillouin scattering light generated in said optical fiber by propagation of the signal light; and guiding the generated counter light such that the counter light propagates in said optical fiber from the second end to the first end, whereby the noise caused by the stimulated Brillouin scattering, which is superimposed on the signal light, is suppressed.

2. An optical signal noise suppressor for suppressing noise caused by stimulated Brillouin scattering generated when signal light propagates, comprising:

an optical fiber having a first end where a signal light enters and a second end opposing the first end;

a light source section outputting a counter light which includes the same optical frequency components as the stimulated Brillouin scattering light generated in said optical fiber by propagation of the signal light;

a first coupler, arranged at the second end side of said optical fiber, guiding the counter light outputted from said light source section into said optical fiber such that the counter light propagates in said optical fiber from the second end to the first end, whereby the counter light guided into said optical fiber propagates in an opposite direction of the signal light; and an interruption section, arranged so as to sandwich said optical fiber together with said first coupler, selectively interrupting the counter light which is guided into said optical fiber via said first coupler and which is emitted from the first end of said optical fiber, wherein said light source section includes a broadband light source which outputs a broadband light as the counter light.

3. An optical signal noise suppressor according to claim 2, wherein an overall length of said optical fiber is 1 km or less.

4. An optical signal noise suppressor according to claim 2, wherein said optical fiber has an nonlinearity coefficient of 10 $W^{-1}km^{-1}$ or more.

5. An optical signal noise suppressor according to claim 2, further comprising an optical filter disposed on a propagation path of the signal light so as to sandwich said first coupler together with said optical fiber, said optical filter interrupting the stimulated Brillouin scattering light generated in said optical fiber by the propagation of the counter light.

6. An optical signal noise suppressor according to claim 2, further comprising an optical attenuator disposed on an optical path between said light source section and said first coupler.

7. An optical signal noise suppressor according to claim 2, wherein said interruption section includes a second coupler extracting counter light amplified by the stimulated Brillouin scattering which is generated in said optical fiber by the propagation of the signal light, and a light receiver receiving the counter light extracted by said second coupler and detecting the power of the counter light, and wherein said light source section adjusts at least one of intensity and wavelength of the counter light outputted from the second end of said optical fiber, based on the power of the counter light detected by said light receiver.

* * * * *